April 17, 1956

F. D. LUTERAN 2,741,999

CANDY MAKING MACHINE

Filed Feb. 4, 1953

INVENTOR.
FRANK D. LUTERAN
BY
Barnes, Kisselle, Laughlin & Raisch
ATTORNEYS

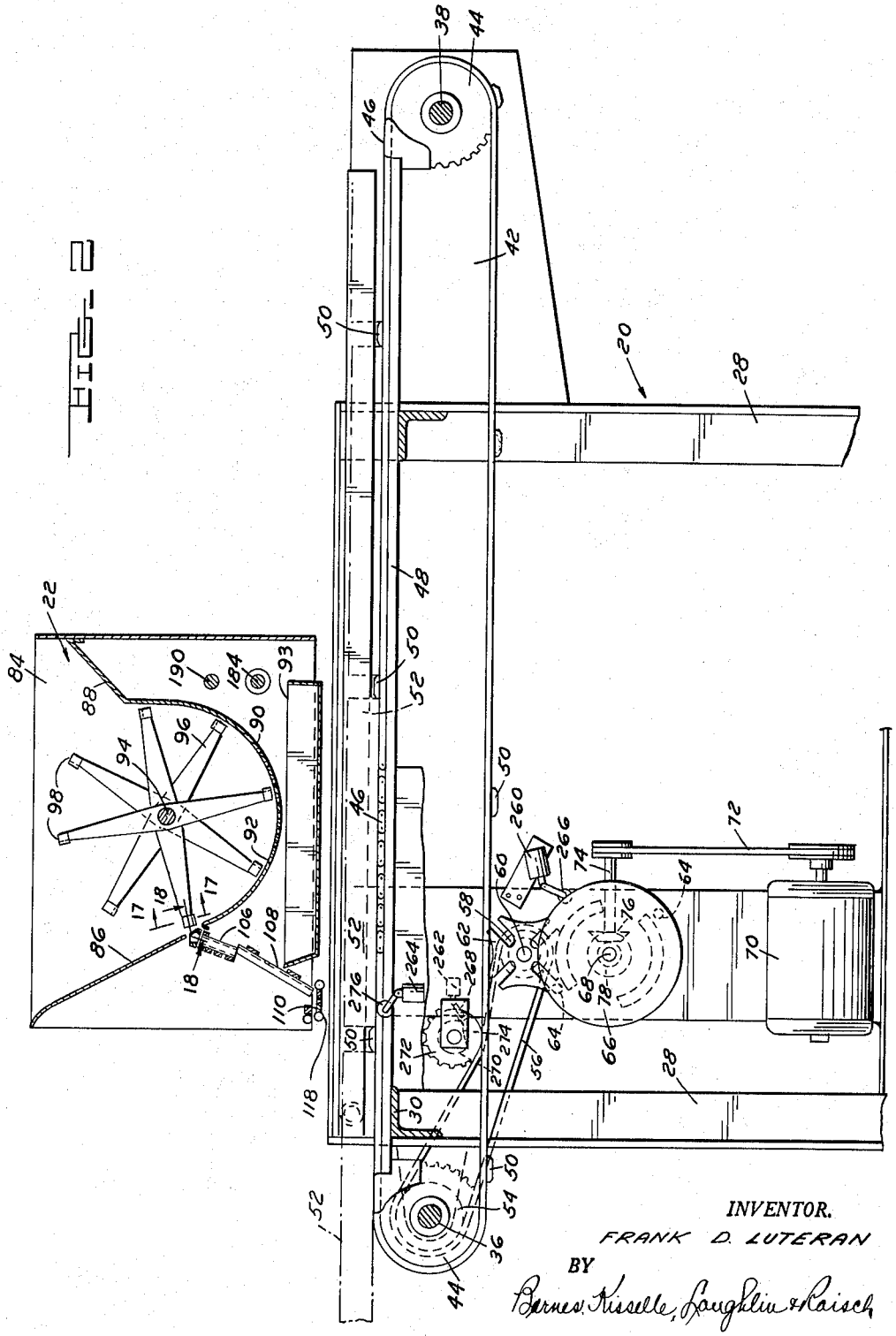

April 17, 1956  F. D. LUTERAN  2,741,999
CANDY MAKING MACHINE
Filed Feb. 4, 1953
8 Sheets-Sheet 3
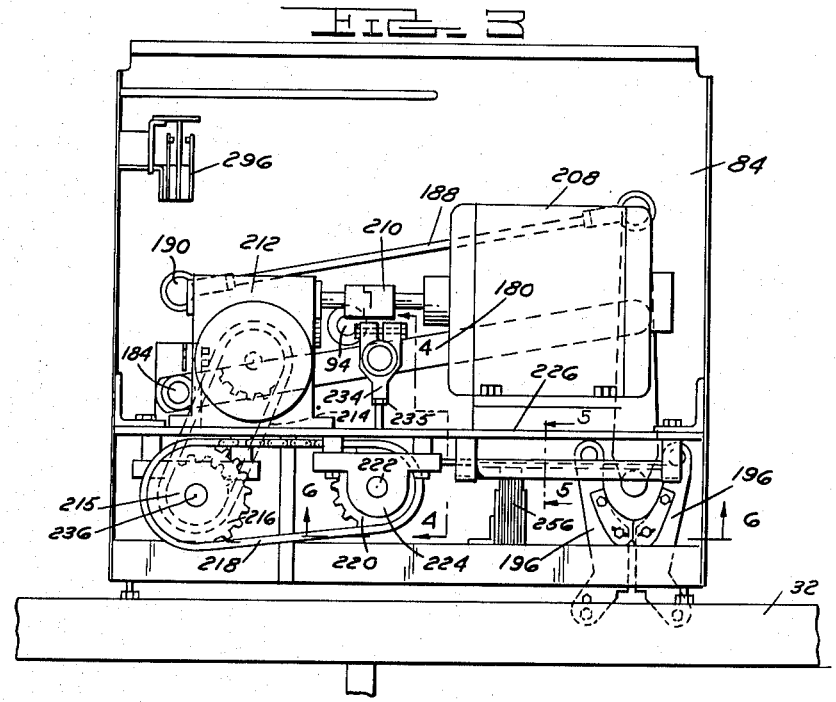
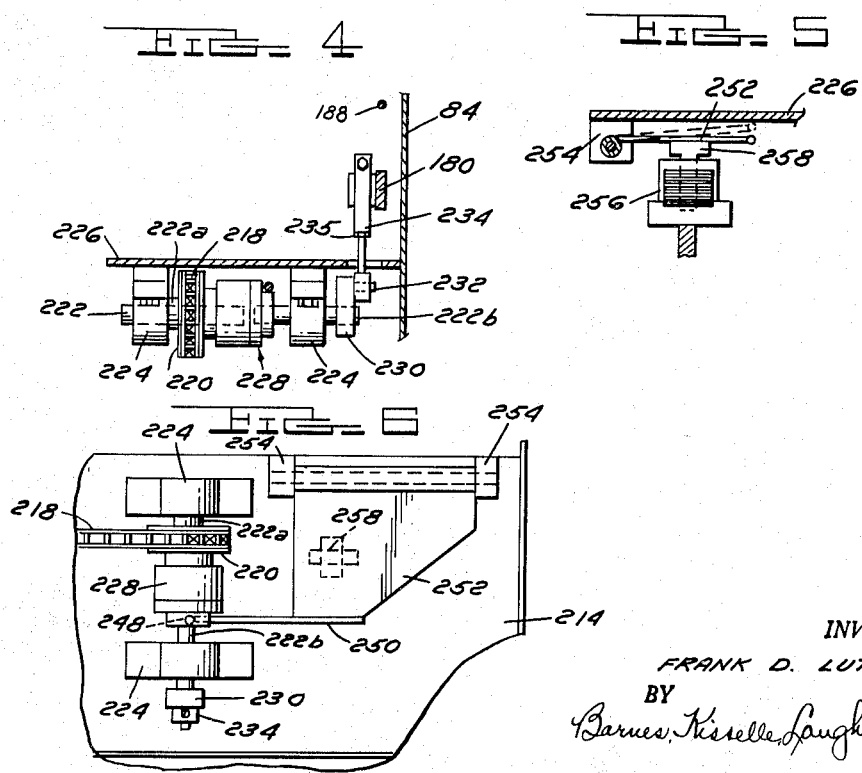
INVENTOR.
FRANK D. LUTERAN
BY
ATTORNEYS April 17, 1956 — F. D. LUTERAN — 2,741,999
CANDY MAKING MACHINE
Filed Feb. 4, 1953 — 8 Sheets-Sheet 4
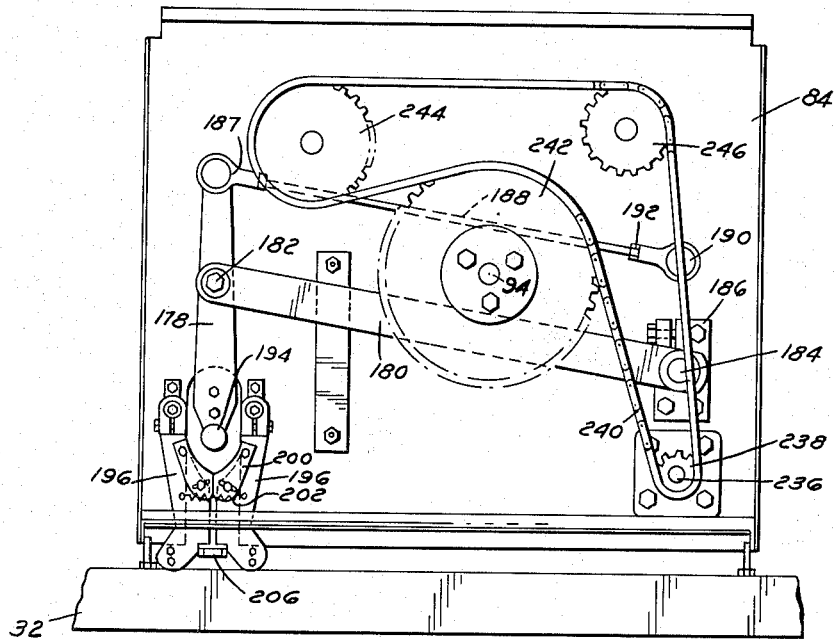
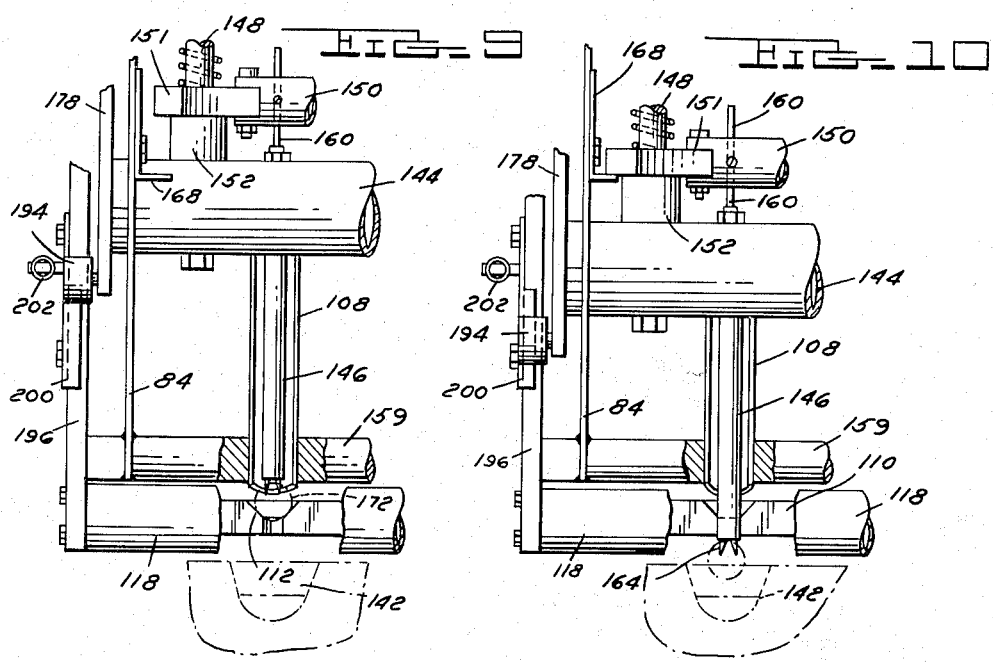
INVENTOR.
FRANK D. LUTERAN
BY
ATTORNEYS

INVENTOR.
FRANK D. LUTERAN
BY
ATTORNEYS

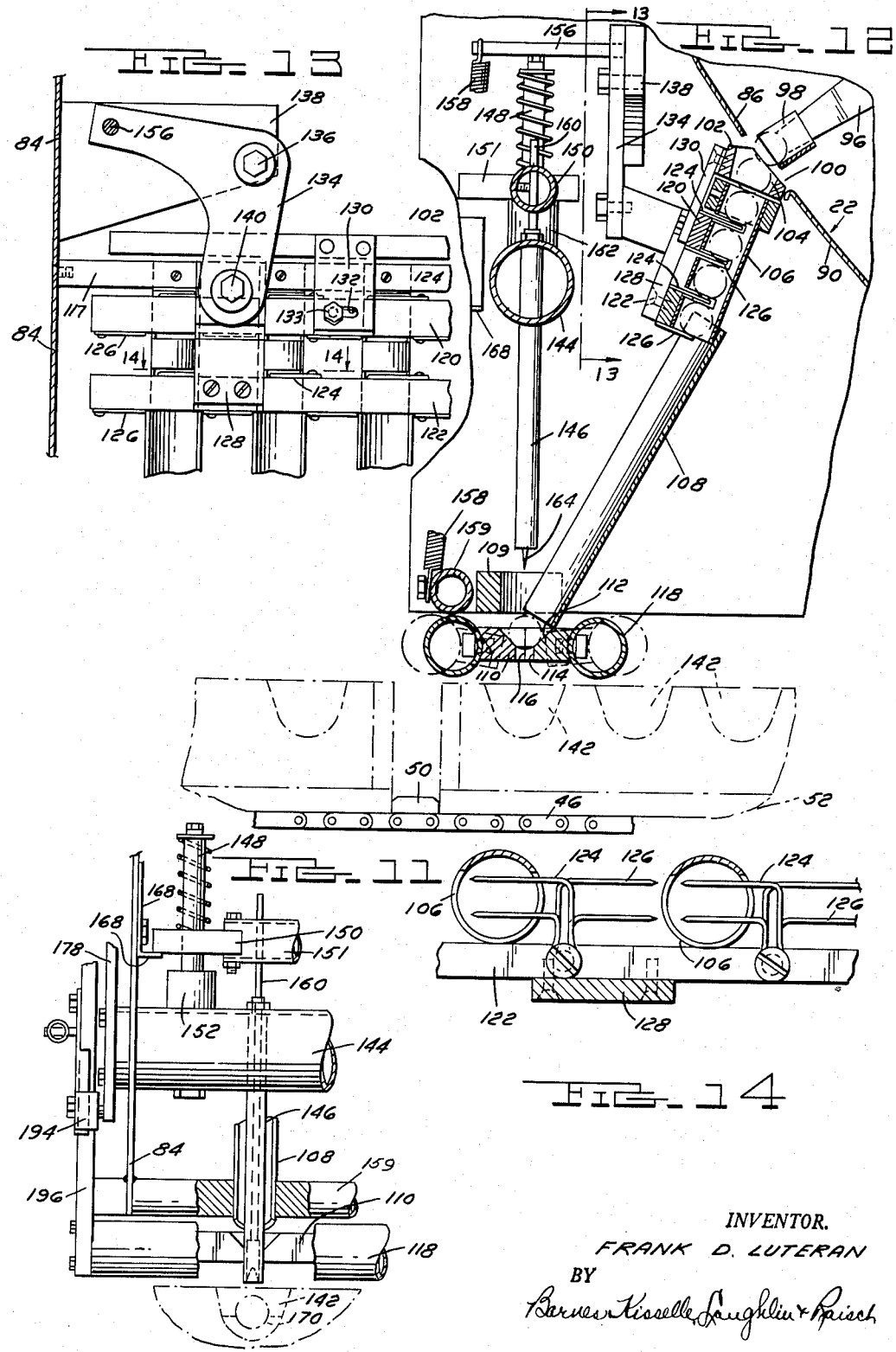

April 17, 1956  F. D. LUTERAN  2,741,999
CANDY MAKING MACHINE
Filed Feb. 4, 1953  8 Sheets-Sheet 7
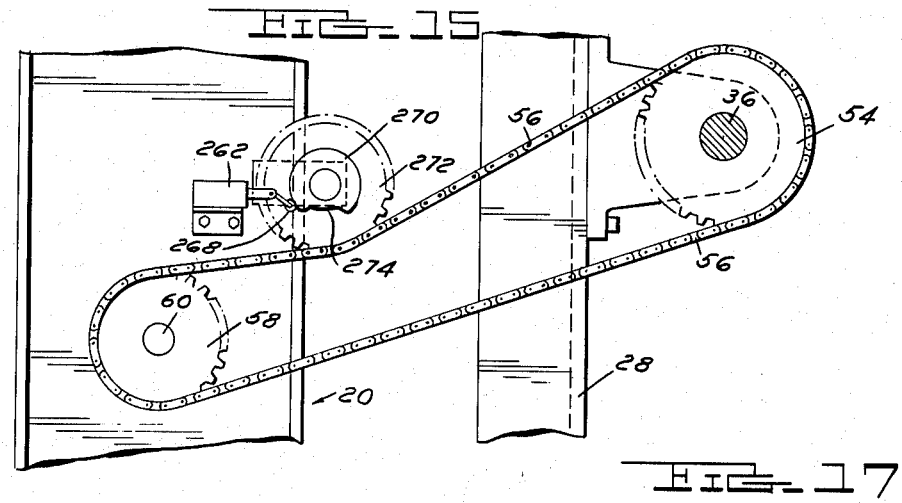
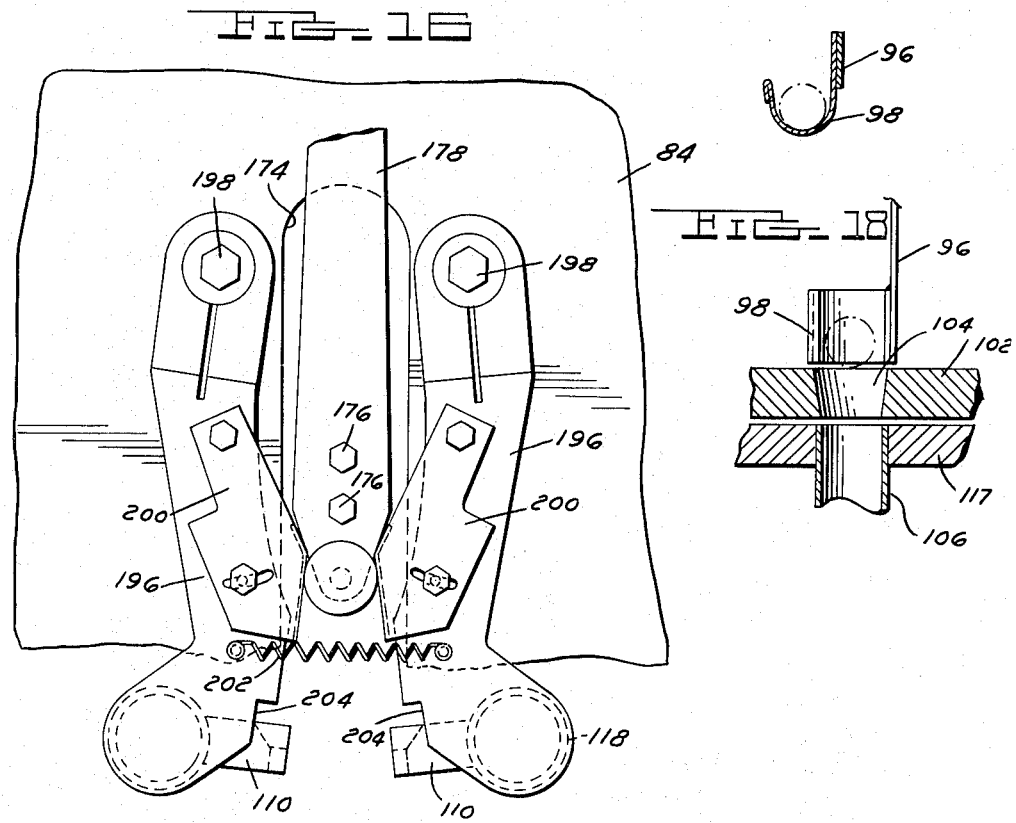
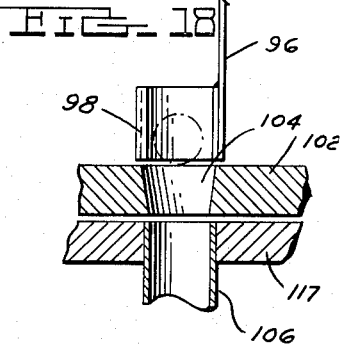
INVENTOR.
FRANK D. LUTERAN
BY
Barnes, Kisselle, Laughlin & Raisch
ATTORNEYS United States Patent Office 2,741,999
Patented Apr. 17, 1956

2,741,999

CANDY MAKING MACHINE

Frank D. Luteran, Dearborn, Mich.

Application February 4, 1953, Serial No. 335,051

27 Claims. (Cl. 107—1)

This invention relates to a candy making machine and more particularly to a machine for depositing pieces of fruit or the like, such as cherries, into soft-center candies such as chocolates.

In the manufacture of soft-center candies such as chocolates it is often desired to incorporate in the soft center pieces of fruit or the like such as cherries. In making such candies the soft-center candy composition is usually poured into cavities formed in starch molds, and cherries or the like are deposited into the soft-center material while in the starch mold. Thereafter, the soft-center candy composition is hardened, coated with chocolate or the like, and then treated to liquify the soft-center candy composition. In accordance with present-day candy making methods, cherries or the like are deposited into the soft centers manually. This manual operation is not only time consuming but also tedious.

It is therefore an object of this invention to produce a machine for automatically and accurately depositing cherries or the like into the soft-center candy composition while the soft-center candy composition is retained in starch molds which travel continuously through the machine.

In the drawings:

Fig. 2 is a vertical sectional view of the machine taken along a plane extending lengthwise of the machine.

Fig. 3 is a fragmentary side elevation of the machine as viewed from the left in Fig. 1 with the end cover removed.

Fig. 4 is a fragmentary sectional view taken along the line 4—4 in Fig. 3.

Fig. 5 is a fragmentary sectional view taken along the line 5—5 in Fig. 3.

Fig. 6 is a fragmentary sectional view taken along the line 6—6 in Fig. 3.

Fig. 7 is a fragmentary side elevation of the machine as viewed from the right in Fig. 1 with the end cover removed.

Fig. 9 is a view similar to Fig. 8 showing the cherry depositing mechanism in a position intermediate its uppermost and lowermost positions.

Fig. 10 is a view similar to Fig. 8 showing the cherry depositing mechanism in a position intermediate the lowermost position and the position shown in Fig. 9.

Fig. 11 is a view similar to Fig. 8 showing the cherry depositing mechanism in its lowermost position.

Fig. 12 is a fragmentary sectional view along the line 12—12 in Fig. 8.

Fig. 13 is a fragmentary sectional view taken along the line 13—13 in Fig. 12.

Fig. 14 is a fragmentary sectional view taken along the line 14—14 in Fig. 13.

Fig. 15 is a detail view showing the drive arrangement for the conveyor mechanism and also showing the timing cam for interrupting the operation of the cherry depositing mechanism.

Fig. 16 is a detail view showing a portion of the cherry depositing mechanism.

Fig. 17 is a fragmentary sectional view taken along the line 17—17 in Fig. 2.

Fig. 18 is a fragmentary sectional view taken along the line 18—18 in Fig. 2.

Figure 1:
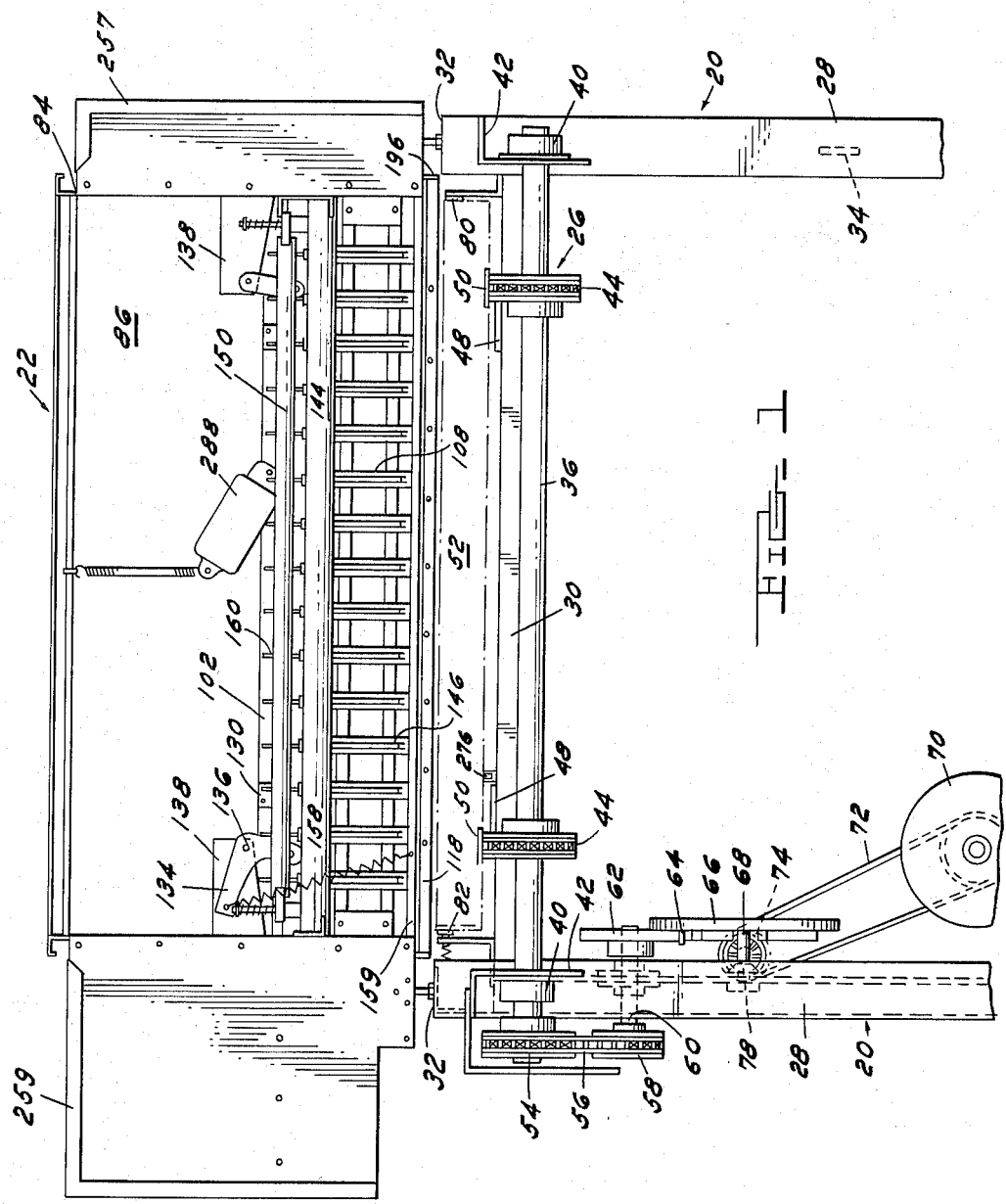
Fig. 1 is a front perspective view of the machine of this invention.

Referring to Fig. 1, which illustrates the general arrangement of the machine, it will be seen that the machine generally includes a base 20, a hopper 22 supported on the base, a cherry depositing mechanism 24, and a conveyor 26. The base 20 includes four upright legs 28 which are connected transversely by braces 30 and in a direction from front to back by upper and lower braces 32 and 34, respectively.

The conveyor 26 includes a pair of shafts 36 and 38 extending transversely of base 20 and journalled for rotation in bearings 40 mounted on extensions 42 at the front and rear of base 20. Each of the shafts 36 and 38 have sprockets 44 fixed thereon. The sprockets 44 on the front shaft 36 are aligned with the sprockets 44 on the rear shaft 38, and a chain 46 extends around each of the pairs of aligned sprockets. Spaced apart supporting plates 48 are mounted on the transverse braces 30 and extend in a direction fore and aft of the machine just below the top runs of chains 46. On each chain 46 there is fixed at regularly spaced intervals a series of spacer blocks 50. The spacing of the spacer blocks 50 on each chain corresponds exactly with the width from front to back of starch mold trays 52 which are adapted to be conveyed forwardly through the machine by chains 46.

At one end front shaft 36 is provided with a sprocket 54 connected as by a chain 56 with a sprocket 58 mounted on a shaft 60 on base 20 (see Fig. 2). Shaft 60 also supports a Maltese cross 62 which cooperates with a pair of diametrically opposite pins 64 on a disc 66 to provide a Geneva drive between a drive shaft 68 and front conveyor shaft 36. A motor 70 has a belt drive 72 with a stub shaft 74 provided with a bevel gear 76 which meshes with a pinion 78 keyed to shaft 68. Thus, when motor 70 is operated, chains 46 are caused to travel around sprockets 44 with a step-by-step movement.

At one side of base 20 there is provided a fixed guide rail 80 adapted to engage the ends of trays 52 (see Fig. 1). At the opposite side of base 20 there is provided a guide rail 82 biased by springs 83 so as to resiliently engage the opposite end of trays 52 and thereby compensate for slight variation in tray lengths (see Fig. 8).

As is shown in Fig. 2, the hopper 22 includes end walls 84, a front wall 86, a rear wall 88, and a generally semi-cylindrical bottom wall 90 which is perforated as at 92. A tray 93 slidably supported below hopper 22 is arranged to receive the juice or other liquid which drains through perforations 92. A shaft 94 extends transversely across hopper 22 and is journalled for rotation in bearings (not shown) mounted on the end walls 84. A plurality of arms 96 are axially spaced along shaft 94 and are fixed thereto to rotate therewith. Arms 96 are arranged in radially staggered relation along shaft 94 and are provided at their opposite ends with U-shaped bucket members 98. The lower edge of front wall 86 and the adjacent edge of bottom wall 90 are spaced apart to provide a discharge opening 100 (see Fig. 12). Positioned adjacent opening 100 on the outside of the hopper is a distributor bar 102 provided with a plurality of openings 104 which are regularly spaced across the extent of opening 100. At their lower ends each opening 104 discharges into a tube 106 the lower end of which opens into an inclined chute 108. Chutes 108 are supported in an inclined position, a support bar 109 positioning their lower ends adjacent a split retainer bar 110 provided with spaced sockets 112 having a cylindrical through portion 114. The retainer bar 110 is centrally split as at 116 into two half sections each of which is reinforced by means of a tubular member 118 secured along the outer longitudinal edges of the half sections. Tubes 106 are supported at their upper ends by a bar 117 secured at each end to the side walls 84.

In order to enable depositing cherries or the like one at a time from hopper 22 into sockets 112, there is provided a pair of transversely extending agitator bars 120 and 122 which are positioned adjacent the front faces of tubes 106. Along the upper edges of bars 120 and 122 there are fixed a plurality of spacer needles 124 and along their lower edges the bars 120 and 122 are provided with a plurality of spacer needles 126. The needles 124 project in a direction towards the left as viewed in Figs. 13 and 14 and the spacer needles 126 project in a direction toward the right as viewed in these figures. Tubes 106 are circumferentially slotted as at 128 to accommodate needles 124 and 126. The spacer needles 126 at the lower edge of bar 122 are arranged, when the bar is shifted axially, to traverse the lower open ends of tubes 106. It will be seen that the needles 124 and 126 divide the tubes 106 into four vertically adjacent compartments.

The arrangement is such that, when the bars are shifted to the right as viewed in Figs. 13 and 14, the needles 124 at the upper edge of bar 122 releases the cherry in the second lowermost compartment of each tube 106 so that these cherries drop to the lowermost compartment and are held therein by the needles 126 at the lower edge of bar 122. At the same time the cherry in the uppermost compartment is permitted to drop to the next lower compartment by reason of the movement to the right of the needles 124 at the upper edge of bar 120. Thus, as the bars 120 and 122 are reciprocated back and forth, the cherries in the compartments of the tube or cartridge 106 are permitted to drop down to the next lower compartment, the cherry in the lowermost compartment dropping into chute 108 and gravitating into socket 112 when bars 120 and 122 are shifted to the left. Bars 120 and 122 are connected by a lug 128 to move in unison. These bars have a lost-motion connection with the distributor bar 102 by means of a bracket 130 provided with a slot 132 through which a bolt 133 extends.

The arrangement is such that bar 102 is shifted transversely of the hopper with bars 120 and 122 but to a lesser extent. It has been found desirable to agitate bar 102 axially because this tends to break the bond between two cherries that might be wedged at the upper end of a single opening or socket 104. This agitation serves to jar the cherries so that one is permitted to drop into opening 104. It will be observed that, as shown in Fig. 12, the space between the needles 124 on the upper edge of bar 120 and the discharge opening 100 in hopper 22 is sufficient to accommodate two cherries. If the distributor bar 102 is fashioned as a thin sheet metal member rather than as a bar member as shown, then, of course, the space above needles 124 at the upper edge of bar 120 would be sufficient only to accommodate a single cherry. At one side of the machine a bell crank 134 is pivoted as at 136 on a fixed support 138 and has a pivotal connection as at 140 with one of the lugs 128. At the other end of the machine a link 135 is pivotally connected at one end with a fixed support 138 and at its other end with the other lug 128. Means about to be described are provided for oscillating bell crank 134 about pivot 136 to thereby reciprocate the bars.

The starch trays 52 are in the form of molds having a plurality of cavities 142 therein which are shaped generally to correspond with the shape of the piece of candy to be molded. Cavities 142 are arranged in rows spaced transversely of the trays 52 so that, as the trays move through the machine, cavities 142 are successively brought into vertical registration with the sockets 112.

Figure 8:
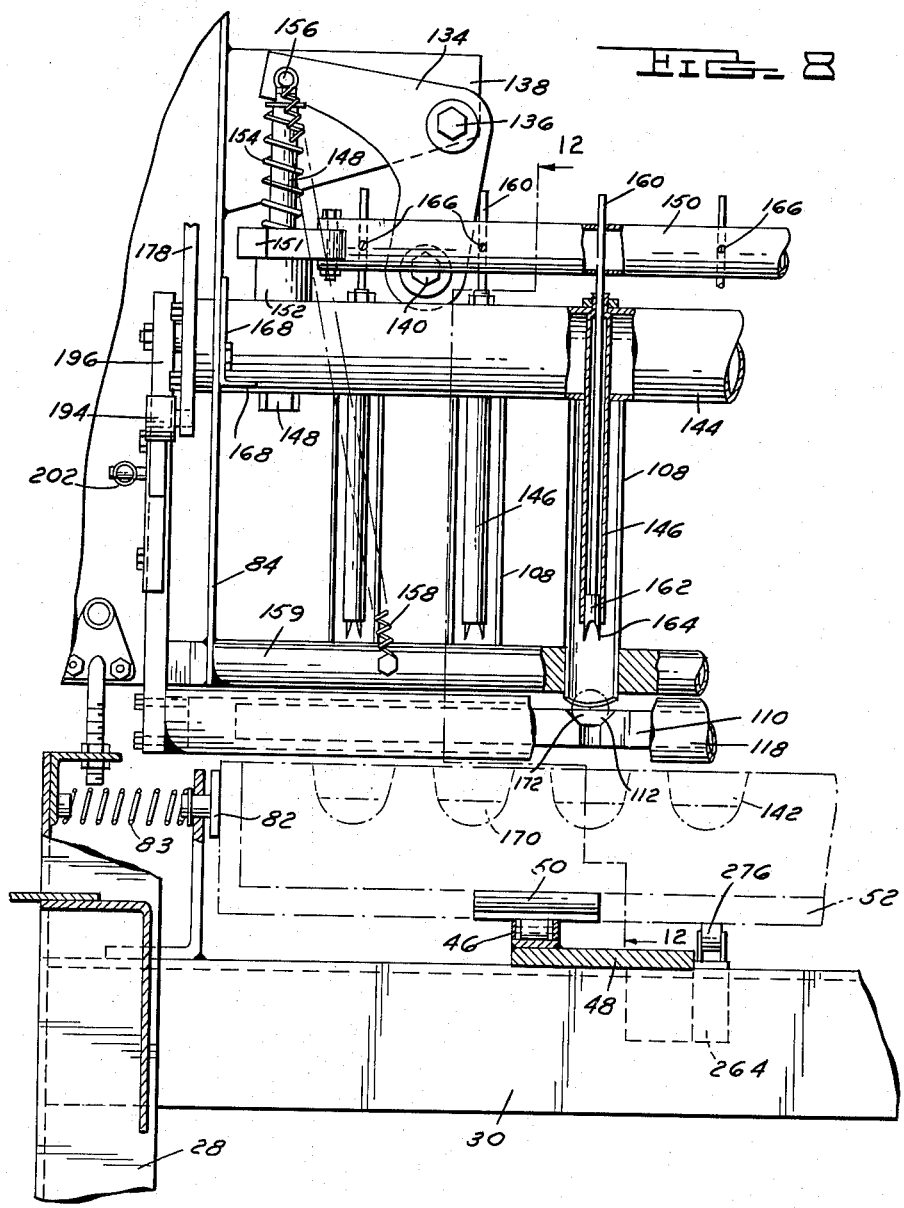
Fig. 8 is a fragmentary front elevation of the machine, parts thereof being shown in section, and illustrating the cherry depositing mechanism in its uppermost position.

The means for depositing the cherries from sockets 112 into the mold cavities 142 includes a tubular depositor bar 144 on which are supported a plurality of sleeves 146, one above each of the cavities 142 (see Fig. 8). A bolt 148 extends upwardly through each end of depositor bar 144 and supports a pin-holding bar 150 for vertical sliding movement relative to depositor bar 144. Bar 150 is mounted for vertical sliding movement on the upper ends of bolts 148 by means of apertured guide blocks 151 at each end thereof. Spacers 152 on the bolts 148 limit the movement of bar 150 downwardly relative to bar 144. A compression spring 154 biases guide blocks 151 downwardly on spacers 152. When depositor bar 144 is moved vertically upwardly, the upper end of bolts 148 are adapted to engage a pin 156 on bell crank 134 to rotate the bell crank in a clockwise direction as viewed from the front of the machine, thus, causing the bars 102, 120 and 122 to be shifted toward the left. A return spring 158 having one end connected to pin 156 and its other end anchored on a transversely extending support bar 159 is utilized for pivoting bell crank 134 in a counterclockwise direction when the depositor bar 144 is lowered.

A series of pins 160 is arranged on bar 150, the pins extending downwardly through sleeves 146 and each having an enlarged head 162 at its lower end which slidably engages the inner face of surrounding sleeve 146. The heads 162 terminate at their lower ends in a pair of prongs 164. Set screws 166 are utilized for holding pins 160 in a vertically adjusted position with respect to sleeves 146. Pins 160 are fixed on bar 150 so that, when the guide blocks 151 are contacting the spacers 152, the prongs 164 project downwardly beyond the lower end of sleeves 146. Adjacent each end of the machine there is provided a stop 168 which is positioned to engage the guide block 151 when the bar 144 is lowered to limit the downward movement of the pin support bar 150. The arrangement is such that, as the bar 144 moves downwardly, sleeves 146 and pins 160 move downwardly in unison to a position where the cherry in each of the sockets 112 is impaled on the lower end of the associated pin 160.

Means are provided for causing the two half sections of bar 110 to separate thereby permitting the lower ends of sleeves 146 to move downwardly below the plane of bar 110 into the corresponding mold cavity 142. Continued downward movement of bar 144 causes guide blocks 151 to abut against stops 168 so that bar 150 is held in a fixed position while the bar 144 continues to move downwardly. This causes sleeves 146 to move downwardly relative to heads 162 to thereby strip the cherries from prongs 164. The cherries are thus deposited into the mold cavities 142 which are preferably previously at least partially filled with a soft-center candy composition 170.

This progressive sequence of operations, which results in the deposition of a cherry into each of the mold cavities 142, is illustrated clearly in Figs. 9, 10 and 11. In Fig. 9 the parts are illustrated in the positions they assume just as the prongs 164 pierce a cherry 172 seated in socket 112. In Fig. 10 depositor bar 144 has moved downwardly to a position where guide blocks 151 have come into engagement with stops 168. In Fig. 11 depositor bar 144 is shown moved still further downwardly with pin support bar 150 retained by the stops 168 at each end thereby causing sleeves 146 to strip the cherries from the lower ends of pins 160 and thereby deposit the cherries in the soft-center candy composition 170 in die cavities 142.

Referring now to Figs. 3, 7 and 16, there is illustrated the means for causing the above described movements of depositor bar 144 and retainer bar 110. Each side wall 84 of the machine is apertured as at 174 to accommodate the ends of the depositor bar 144. At each end the depositor bar is secured as by bolts 176 to the lower end portion of a vertically movable actuator bar 178. A lift bar 180 is pivotally connected with each actuator bar 178 as at 182. The opposite ends of lift bars 180 are fixed to a shaft 184 which extends transversely across the machine on the rear side of the hopper 122 and is journalled at each end in bearing blocks 186 which are mounted on the side walls 184. To the upper end of each actuator bar 178 there is pivotally attached as at 187 one end of a stabilizer bar 188. The opposite ends of stabilizer bars 188 are connected by a shaft 190 which is rotatably supported on the side walls 84 at points spaced vertically above the ends of shaft 184. The arrangement is such that the lift bars 180 and the stabilizer bars 188 at the opposite sides of the machine form a parallelogram linkage with the actuator bars 178. Stabilizer bars 188 are preferably adjustable in length as by a nut 192 so that, by turning nut 192, the sleeves 146 and the pins 160 can be tilted forwardly or rearwardly to align the prongs 164 centrally with respect to the sockets 112 in retainer bar 110.

Referring particularly to Fig. 16, it will be observed that at the lower end of each actuator bar 178 there is rotatably supported a roller 194. A rocking lever 196 is pivotally supported as at 198 on side wall 84 at each side of actuating bar 178. The lower ends of rocking levers 196 support the half sections of retainer bar 110. On each rocking lever 196 there is adjustably secured a cam member 200 which is adapted to be engaged by the rollers 194 as the actuating bars 178 move vertically downwardly. Rocking levers 196 at each end of the machine are urged towards each other by means of tension springs 202 so that, as rollers 194 move upwardly out of engagement with cams 200, the rocking levers 196 are caused to pivot toward each other. The lower end portions of rocking levers 196 are notched as at 204 so as to abut against a stop 206 as each of the levers pivots to a central position wherein the split half sections of retainer bar 110 come together to form the sockets 112.

The actuator bars 178 are reciprocated vertically by means of an electric motor 208 (Fig. 3) which is connected through a coupling 210, a speed reducer 212, and a chain drive 214 with a sprocket 215 at one side of the machine. Sprocket 215 is fixed at one end of a shaft 236 which extends across the machine. A second sprocket 216 is also fixed at one end of shaft 236. A chain 218 connects sprocket 216 with a sprocket 220 fixed on a shaft 222 which is journalled in bearing blocks 224 mounted on the under side of a support plate 226 on which motor 208 and speed reducer 212 are supported. Shaft 222 is a split shaft, the two portions of which, 222a and 222b, are connected by a one-revolution clutch 228 (see Figs. 4 and 6). An eccentric 230 provided with a crank pin 232 is mounted on shaft 222 on the opposite side of clutch 228. A connecting rod 234 has its lower end connected with crank pin 232 and its upper end pivotally connected with the lift bar 180. Thus, as the eccentric 230 rotates, it will be observed that the two lift bars 180 are caused to pivot upwardly and downwardly and thereby vertically oscillate the actuator bars 178. Connecting rod 234 is adjustable in length as by the nut 235 in order to adjust the length of stroke of lift bar 180.

As mentioned above clutch 228 is in the form of a one-revolution clutch. On the periphery of the clutch there is mounted a radially projecting pin 248 which is arranged to be engaged by a bar 250 supported on a plate 252 which is pivotally mounted between a pair of downwardly projecting bosses 254 on the under side of plate 226. Plate 252 is arranged for pivotal movement about a horizontal axis extending fore and aft of the machine. When plate 252 is pivoted upwardly bar 250 releases pin 248 and thus enables clutch 228 to provide a driving connection between the two shaft portions 222a and 222b which in turn causes rotation of eccentric 230. The means for actuating plate 252 to release the clutch are preferably in the form of a solenoid coil 256 associated with an armature 258 which, when the coil is energized, is shifted upwardly to pivot plate 252 upwardly (see Fig. 5).

The shaft 236 on which sprocket 215 is fixed extends across the rear side of hopper 22 and at the opposite end thereof there is fixed a sprocket 238. A chain 240 around sprocket 238 drives a larger sprocket 242 which is fixed to the end of shaft 94 on which the arms 96 in hopper 22 are mounted. Chain 240 also extends around a pair of idler sprockets 244 and 246. Thus, shaft 236 forms the drive shaft for rotating the radial arms 96 within the hopper. The mechanisms at each end of hopper 22 are normally protected by end covers 257 and 259 (see Fig. 1).

The circuit through solenoid coil 256 is controlled by three micro-switches 260, 262 and 264. These switches are connected in series and are of the normally open type. Switch 260 is provided with an actuator 266 which is arranged to be engaged by the two pins 64 on disc 66 which are engaged by the Maltese cross 62 that provides a Geneva drive between the conveyor motor 70 and conveyor drive shaft 36. Microswitch 262 is provided with an actuator 268 which rides on a timing cam 270 fixed on an idler sprocket 272 driven by the conveyor drive chain 56. Timing cam 270 has a cut-away portion 274 which opens switch 262 when its actuator 268 rides thereover. Switch 264 has a roller actuator 276 which is arranged to engage the bottom of the trays 52 being conveyed through the machine to close switch 264.

Figure 19:
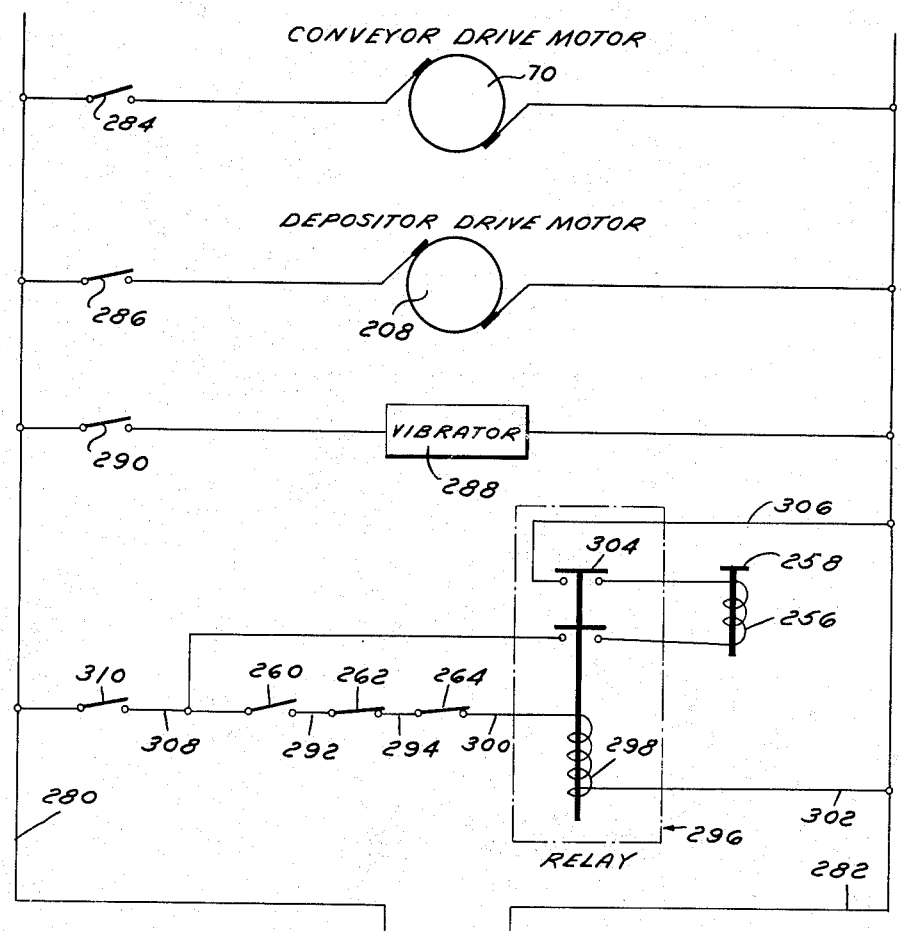
Fig. 19 shows diagrammatically the electrical circuit of the machine.

Referring now to Fig. 19, wherein the electrical circuit of the machine is shown diagrammatically, it will be seen that current for operating the various electrical devices illustrated is supplied by a pair of conductors 280 and 282. The conveyor drive motor 70 is connected across these conductors through a toggle switch 284. The depositor drive motor 208 is connected across the supply lines 280 and 282 through a toggle switch 286. A vibrator 288 mounted on the front side of hopper 22 (see Fig. 1) is connected across the supply lines through a toggle switch 290. As mentioned previously, microswitches 260, 262 and 264 are connected in series as by conductors 292 and 294. A relay 296 has its coil 298 connected at one end with one side of switch 264 as by a conductor 300, and at its other end coil 298 connects with the supply line 282 as by a conductor 302. The armature 304 of relay 296 is adapted, when attracted by coil 298, to close a circuit through solenoid coil 256. Armature 304 connects coil 256 across lines 280 and 282 by means of conductors 306 and 308 and a toggle switch 310.

Thus, it will be appreciated that in order to energize coil 256 and thereby enable the chain 218 to drive clutch 228 it is essential that micro-switches 260, 262, and 264 are all closed. Switch 260 is arranged to be closed by pins 64 whenever a row of starch mold cavities 142 advances to a position disposed directly below the row of sockets 112 in retainer bar 110. The timing disc 270 is arranged to maintain micro-switch 262 closed during that portion of the operation when a tray is traveling beneath the retainer bar 110. The cut-away portion 274 of disc 270 is arranged to open micro-switch 262 during an interval of time corresponding to two successive intermittent movements of trays 52 which correspond to the spacing between the rearmost row of mold cavities 142 in one tray and the foremost row of cavities 142 in the next successive tray. The trays are, of course, spaced apart a fixed distance by means of spacer blocks 50 on conveyor chain 46.

The operation of the machine is as follows: A suitable quantity of cherries is deposited in hopper 22. Thereafter, toggle switches 284, 286, 290 and 310 are closed. Circuits through motors 70 and 208 and vibrator 288 are thus closed, and the circuit of the micro-switches 260, 262 and 264 is conditioned for closing. Thus, shaft 94 is rotated, causing arms 98 to sweep radially through the hopper and deposit cherries in each of the sockets 104 of bar 102 at the upper end of sleeve 106. At the same time drive shaft 36 drives chain 46 in a direction such as to advance trays 52 through the machine in a direction from back to front. A tray is then placed upon the upper run of chain 46 at the rear end of the machine with the front edge of the tray positioned against a pair of spacer blocks 50. As soon as the tray reaches a position wherein the first row of starch mold cavities 142 is aligned directly below the row of sockets 112 in retainer bar 110, micro-switches 260, 262 and 264 are closed. The closing of these switches energizes solenoid coil 256, thus causing the armature 258 to pivot plate 252 upwardly to release pin 248. The clutch 228 thus provides a driving connection between the two shaft portions 222a and 222b which causes the lift bars 180 to carry the actuator bars through one cycle of operation.

It will be observed that micro-switch 260 is closed only momentarily by pins 64. Thus, clutch 228 rotates through only one revolution before pin 248 is again engaged by bar 250. However, during this one revolution, actuator bars 178 are caused to reciprocate from the position shown in Fig. 7 down to the position shown in Fig. 16 and then back to the position shown in Fig. 7. As the actuator bars 178 move downwardly, they cause the depositor bar 144 to likewise move in a downward direction. As bar 144 moves downwardly, bell crank levers 134 are shifted in a counterclockwise direction, and the bars 120 and 122 are shifted to the right as viewed from the front of the machine. This causes the pins 126 at the lower edges of bars 120 and 122 to slide into their associated slots in tubes 106 and causes the pins 124 at the upper edges of these bars to shift in a direction out of the tubes thus permitting the cherries in tubes 106 to shift downwardly one compartment.

At this time the prongs 164 have moved downwardly sufficiently to pierce the cherries previously deposited in sockets 112, and simultaneously therewith rollers 194 engage cams 200 to pivot rocker arms 196 outwardly in a direction away from each other. Thus, the two half sections of retainer bar 110 are separated; and the lower ends of sleeves 146, together with the heads 162 of pins 160 with the cherries impaled thereon, move downwardly into the aligned cavities 142 in the starch tray. At this time the blocks 151 at each end of bar 150 abut against stops 168 while retainer bar 144 continues to move downwardly. This causes the sleeves 146 to strip the cherries off prongs 164 and deposit them accurately into the center of the aligned mold cavities 142. Thus, the arrangement is such that whenever one of the starch trays is positioned such that a row of cavities therein is aligned directly below the sockets 112 in bar 110, the agitator bars 120 and 122, the cherry depositing mechanism, namely, the pins 160 and the sleeves 146, and the half sections of the retainer bar 110 are actuated to deposit a cherry accurately in the center of each cavity.

The operation of these mechanisms is synchronized by the micro-switches 260, 262 and 264. Micro-switch 260 closes the circuit at time intervals corresponding to the time required by the conveyor chain 46 to move the starch tray forwardly a distance corresponding to the distance between centers of successive rows of cavities 142. Micro-switch 262 is actuated by cam 270 to maintain the circuit to electromagnet 256 normally closed, the cut-away portion 274 of cam 272 being designed to open the circuit through solenoid 256 for a time interval corresponding to the time required for the conveyor chain 46 to move the trays a distance corresponding to the centers between the last row of cavities on one tray and the first row of cavities on the next successive tray. Micro-switch 264, of course, is provided for enabling switches 260 and 262 to close the circuit through the solenoid 256 and thereby actuate the cherry depositing mechanism only when a tray is disposed beneath the cherry retainer bar 110.

It will be observed that, generally speaking, the machine described herein comprises a depositor mechanism and a conveyor mechanism. The purpose of the conveyor mechanism is, of course, to position the starch mold trays under the depositor mechanism so that the cherries will be deposited centrally within the cavities in the starch molds. Thus, it will be appreciated that the depositor mechanism may be mounted on other conveyor mechanisms. For example, the depositor mechanism may be used in conjunction with the conveyor of a machine used for pumping the soft-center composition into the cavities of the starch mold trays. With such an arrangement the depositor mechanism may be actuated by the pumps on the filling mechanism rather than the electro-magnet employed on the machine illustrated in the drawings.

I claim:

1. A machine for depositing fruit pieces and the like into soft centered candies comprising a support, a hopper on said support having openings therein through which the fruit pieces are adapted to be discharged, a retainer having a plurality of sockets therein, means for discharging fruit pieces from said hopper and depositing them one at a time into said sockets, a mechanism for moving a mold under said sockets, said retainer having means for moving portions of the sockets laterally so as to form a vertical opening through each socket and means timed in operation with the opening of sockets to pass downwardly through said open sockets and deposit said fruit pieces one at a time from said sockets into said mold.

2. A machine for depositing fruit pieces and the like into soft centered candies comprising a support, a hopper on said support having openings therein through which the fruit pieces are adapted to be discharged, a retainer having a plurality of sockets therein, means for discharging fruit pieces from said hopper and depositing them one at a time into said sockets, means timed in operation with said discharging means for moving portions of the sockets laterally so as to form a vertical opening through each socket, a mechanism for moving a starch mold having candy cavities along a path adjacent said retainer, and means synchronized in operation with said discharging means to move downward through said open sockets and deposit fruit pieces retained in said sockets one at a time into the cavities of said mold.

3. A machine for depositing fruit pieces and the like into soft centered candies comprising a support, a hopper on said support having openings therein through which the fruit pieces are adapted to be discharged, a retainer having a plurality of sockets therein, means for discharging fruit pieces from said hopper and depositing them one at a time into said sockets, a mechanism for moving a mold having a series of successive candy cavities with a step-by-step motion along a path adjacent said retainer, and means synchronized in operation with said discharge means and said mold moving means for intermittently moving portions of the sockets laterally so as to form a vertical opening through each socket and gripping fruit pieces retained in said sockets and depositing them through the open sockets one at a time into said successive cavities of said mold.

4. A machine for depositing fruit pieces and the like into soft centered candies comprising a support, a hopper on said support having spaced apart openings therein through which fruit pieces are adapted to be discharged, a retainer positioned at a level below said hopper, said retainer having a plurality of spaced sockets therein corresponding in number with said openings in said hopper, discharge means adjacent said openings for intermittently discharging fruit pieces from said hopper, means extending between said discharge means and said sockets for permitting fruit pieces discharged by said discharge means to gravitate one at a time into said sockets, a conveyor mechanism for successively moving candy molds under said sockets, and means for opening said sockets for permitting the fruit piece retained therein to be deposited into the mold positioned therebelow.

5. The combination set forth in claim 4 wherein said conveyor mechanism is adapted to move said candy molds with a step-by-step movement, said last mentioned means being synchronized in operation with said conveyor mechanism to permit depositing the fruit piece in the mold therebelow while the mold is in arrested position between successive movements thereof.

6. The combination set forth in claim 5 including means operated in synchronism with said last mentioned means for gripping the fruit piece in said socket before the socket has opened and moving the fruit piece downwardly into the mold after the socket has opened.

7. The combination set forth in claim 6 wherein said means for gripping the fruit piece comprises a plurality of pins, one for each socket, said pins being positioned above said sockets and being movable in a downward direction so that the fruit piece in each socket is adapted to be impaled on the lower end of the associated pin, and including a member surrounding the lower end of each pin and movable relative thereto for stripping the fruit piece from the end of the pin and depositing it in said mold.

8. In a candy making machine, the combination of a support, a member on said support having a socket therein, means for depositing fruit pieces one at a time in said socket, a conveyor mechanism for moving a series of candy molds with a step-by-step movement along a path adjacent said socket, and means synchronized in operation with said conveyor mechanism for intermittently moving portions of the sockets laterally to form a vertical opening through each socket, gripping the fruit pieces therein and depositing fruit pieces through said open sockets one at a time from said socket into said candy molds.

9. The combination set forth in claim 8 including a hopper having a discharge opening positioned adjacent said means for depositing fruit pieces one at a time in said socket.

10. In a candy making machine, the combination of a support, a retainer on said support having a socket therein, means for depositing fruit pieces one at a time in said socket, a conveyor mechanism for moving a series of candy molds with a step-by-step movement along a path below and adjacent said socket, an upright, vertically movable pin aligned generally axially with said socket, means for moving said pin toward said socket so as to impale at the leading end thereof the fruit piece retained in said socket, means for opening said socket when the fruit piece retained therein has been impaled on the end of said pin, and means for stripping said fruit piece from the end of said pin so as to deposit the fruit piece in the candy mold positioned beneath said socket.

11. The combination set forth in claim 10 including a second support, said pin being mounted on said second support, and means for pivotally adjusting said support about an axis generally perpendicular to the axis of the pin.

12. The combination set forth in claim 10 wherein said last mentioned means comprises a sleeve telescoped over said pin, and means for moving said sleeve downwardly beyond the lower end of the pin.

13. The combination set forth in claim 10 wherein said retainer comprises two members which are separable for opening said socket.

14. In a candy making machine, the combination of a support, a retainer on said support having a socket therein, a conveyor mechanism for moving a series of candy molds intermittently along a path such that the candy molds are successively positioned beneath said socket, means for depositing fruit pieces in said socket one at a time, means for intermittently opening said socket to allow the fruit piece retained therein to pass downwardly therethrough into the mold positioned therebelow, a pair of relatively movable members on said support, a pin on one of said members and a sleeve on the other of said members surrounding said pin, said pin normally projecting downwardly beyond the lower end of the sleeve, means for moving said members such that said sleeve and pin move downwardly through said sockets, said last mentioned means being arranged to move said sleeve downwardly an amount greater than the extent of downward movement of said pin, and means for synchronizing the actuation of said means for depositing fruit pieces in said socket, said means for opening said socket, said means for moving said members, and said conveyor mechanism such that said pin and sleeve are intermittently moved downwardly to impale on the lower end of said pin a fruit piece retained in said socket whereupon said socket is opened and said fruit piece is stripped from the end of said pin and deposited in the candy mold positioned below said socket.

15. The combination set forth in claim 14 wherein said member which supports said pin is supported for vertical movement on said member which supports said sleeve and including a stop on said support for arresting the movement of said pin supporting member relative to said sleeve supporting member.

16. A machine for depositing fruit pieces into regularly spaced cavities of an intermittently moving mold comprising a support, a hopper on said support adapted to contain a quantity of the fruit pieces, said hopper having a plurality of discharge openings therein, means in said hopper for depositing fruit pieces in said discharge openings, a retainer on said support having a row of sockets therein spaced apart to correspond with the spacing of the cavities in said mold, means for discharging fruit pieces one at a time from said discharge openings and depositing said fruit pieces one at a time in said sockets, a conveyor mechanism for intermittently moving a series of said molds along a path such that the cavities therein extend as a row beneath each socket in said retainer, means for separating portions of the sockets by moving said portions laterally to form a vertical opening through each of said sockets and means for gripping the fruit pieces in said sockets and movable downwardly through the openings in said sockets for depositing the fruit pieces retained therein into the mold cavity disposed therebelow.

17. The combination set forth in claim 16 including an electrically operated device for actuating said means for discharging fruit pieces from said hopper, said means for opening said sockets and said means for depositing the fruit pieces retained therein in said cavities and means for synchronizing the operation of said electrically operated device with said conveyor mechanism.

18. The combination set forth in claim 16 including an electrically operated device for actuating said means for discharging fruit pieces from said hopper, said means for opening said sockets and said means for depositing the fruit pieces retained therein in said cavities and switch means actuated by said conveyor mechanism for intermittently closing the circuit of said electrically operated device.

19. The combination set forth in claim 18 wherein said switch means comprises a first switch adapted to be closed by a mold disposed below said retainer on said conveyor mechanism, a second switch which is intermittently actuated by said conveyor mechanism to open for a period of time corresponding to the time required for the conveyor mechanism to move the mold a distance corresponding to the spacing between the centers of the cavities in said mold, and a third switch actuated by said conveyor mechanism to open during an interval of time corresponding to the time required for the conveyor mechanism to travel a distance corresponding to the distance between the last row of cavities on one mold and the first row of cavities on the next adjacent mold, said switches being connected in series in said circuit.

20. The combination set forth in claim 19 wherein said conveyor mechanism includes a movable support on which said molds are adapted to be positioned and stop members for positioning the molds on said movable support in a predetermined position relative to the support and to each other, and means for actuating said second switch whenever a row of cavities is vertically aligned with said row of sockets.

21. In a candy making machine, the combination of a hopper adapted to contain a quantity of fruit pieces generally of the same size, said hopper having an opening therein through which the fruit pieces are adapted to be discharged, said hopper having a generally semi-cylindrical bottom wall, said discharge opening being disposed in a plane above the bottom of the hopper, a sweeper member in said hopper, means for rotating said sweeper member such that the outer end thereof sweeps circumferentially around said bottom wall in the vertical plane of said discharge opening, and means at the outer end of said sweeper member for engaging a fruit piece on the bottom wall of said hopper and moving it to said discharge opening when the sweeper member is rotated.

22. The combination set forth in claim 21 wherein said discharge opening is dimensioned to accommodate only a single fruit piece and is fashioned in a member defining a wall portion of said hopper which is movable with respect to said bottom wall and including means for agitating said movable wall portion.

23. In a candy making machine, the combination of a hopper adapted to contain a quantity of fruit pieces generally of the same size, said hopper having an opening therein through which the fruit pieces are adapted to be discharged, a retainer positioned at a level below said discharge opening, said retainer having a socket therein in which a fruit piece is adapted to be seated, means for directing fruit pieces one at a time from said discharge opening to said socket comprising a chute extending from said discharge opening downwardly to said socket, and a plurality of separators spaced along said chute, said separators being movable transversely of said chute to and from a position obstructing the passage of a fruit piece through the chute, said separators being divided into two groups, the separators of one group being spaced along the chute from the separators of the other group a distance corresponding generally to the size of said fruit pieces, and means for alternately moving said two groups of separators to and from said position obstructing said chute.

24. In a candy making machine, the combination of a retainer having a row of spaced sockets therein, each of said sockets being adapted to retain a fruit piece, a series of vertically extending pins above said retainer, each pin being aligned vertically with one of said sockets, a support for supporting said pins in said position aligned with said sockets, means for moving said support downwardly so that the fruit pieces in said sockets are impaled by the lower ends of said pins, said retainer including a member movable to open said sockets to permit said pins with the fruit pieces impaled thereon to move downwardly therethrough, and means operatively connected with said pin support for actuating said movable member of said retainer.

25. The combination set forth in claim 24 wherein said retainer is split longitudinally through said row of sockets into two half sections, said half sections being supported for movement toward and away from each other, said last mentioned means being actuated in response to vertical movement of said pin support for moving said half sections toward and away from each other.

26. In a candy making machine, the combination of a retainer having a row of sockets therein, each of which is adapted to retain a fruit piece, a conveyor mechanism for moving a series of molds with a step-by-step movement below said sockets, said molds being of the type having successive rows of cavities therein, said conveyor mechanism being adapted to successively and momentarily position each row of cavities beneath said row of sockets, means for opening said sockets and for depositing the fruit pieces therein into the row of cavities positioned therebelow, a motor for operating said last mentioned means, a clutch operatively connecting said motor and said last mentioned means, an electromagnet for placing the clutch in clutching engagement between said motor and said last mentioned means, and switch means intermittently actuated by said conveyor mechanism for intermittently closing a circuit through said electromagnet.

27. The combination set forth in claim 26 wherein said clutch is of the type which rotates through a single revolution each time the circuit through said electromagnet is momentarily closed, said means for opening said sockets and for depositing fruit pieces in said cavities being operatively connected with said clutch such that a single revolution of said clutch produces a complete cycle of opening and closing said sockets and depositing of the fruit pieces in said cavity.

References Cited in the file of this patent

UNITED STATES PATENTS

| | | |
|---|---|---|
| 1,385,462 | Marvin et al. | July 26, 1921 |
| 1,556,610 | Keish et al. | Oct. 13, 1925 |
| 1,793,752 | Schuler | Feb. 24, 1931 |
| 1,803,656 | Schuler | May 5, 1931 |
| 2,566,712 | Zeur | Sept. 4, 1951 |
| 2,642,010 | Zimmer | June 16, 1953 |